United States Patent
Gounder et al.

(10) Patent No.: US 12,418,440 B2
(45) Date of Patent: Sep. 16, 2025

(54) METHOD TO BUILD A SERVICE FUNCTION CHAIN IN AN OVERLAY NETWORK

(71) Applicant: Google LLC, Mountain View, CA (US)

(72) Inventors: Arivudainambi Appachi Gounder, San Jose, CA (US); Edward Crabbe, Seattle, WA (US); Madhu Venugopal, Cupertino, CA (US); Stephen Stuart, Los Altos Hills, CA (US)

(73) Assignee: Google LLC, Mountain View, CA (US)

( * ) Notice: Subject to any disclaimer, the term of this patent is extended or adjusted under 35 U.S.C. 154(b) by 518 days.

(21) Appl. No.: 17/750,713

(22) Filed: May 23, 2022

(65) Prior Publication Data

US 2023/0379190 A1   Nov. 23, 2023

(51) Int. Cl.
*H04L 12/46* (2006.01)
*H04L 45/745* (2022.01)

(52) U.S. Cl.
CPC ........ *H04L 12/4633* (2013.01); *H04L 45/745* (2013.01)

(58) Field of Classification Search
CPC ............... H04L 12/4633; H04L 45/745; H04L 45/0377; H04L 45/34; H04L 2212/00; H04L 12/2859; H04L 12/4641; H04L 63/00; H04L 69/08; H04L 45/7452; H04L 45/7459; H04L 61/00
See application file for complete search history.

(56) References Cited

U.S. PATENT DOCUMENTS

| | | | |
|---|---|---|---|
| 9,866,472 B2 | 1/2018 | Biancaniello | |
| 9,923,815 B2 | 3/2018 | Assarpour et al. | |
| 10,986,675 B2 | 4/2021 | Sternberg et al. | |
| 2016/0094396 A1* | 3/2016 | Chandrashekhar | H04L 41/0816 370/254 |
| 2017/0063783 A1* | 3/2017 | Yong | H04L 69/22 |
| 2017/0310611 A1 | 10/2017 | Kumar et al. | |
| 2018/0091420 A1* | 3/2018 | Drake | H04L 69/325 |

(Continued)

FOREIGN PATENT DOCUMENTS

| | | | | |
|---|---|---|---|---|
| CN | 104243270 A | * | 12/2014 | |
| CN | 108924062 A | * | 11/2018 | ........... H04L 47/825 |

(Continued)

OTHER PUBLICATIONS

You, "Message forwarding method and device based on service function chain", Oct. 2, 2020, CN, English machine translation of CN 111740900 A (Year: 2020).*

(Continued)

*Primary Examiner* — Brian T Le
(74) *Attorney, Agent, or Firm* — Lerner David LLP

(57) ABSTRACT

Implementations are provided for building a service function chain in a network that can remove the requirement to encapsulate packet level metadata or other packet levels in a service function chain. The approach allows for implementing service function chains while separating chain metadata from the service function so that service functions are not required to support handling service function chaining metadata. The approach can map a tunnel identifier of an encapsulated data packet to an attachment circuit of a service function and can rewrite the destination media access control (MAC) address of the data packet to the MAC address of the service function.

17 Claims, 5 Drawing Sheets

(56) References Cited

U.S. PATENT DOCUMENTS

| | | |
|---|---|---|
| 2018/0219771 A1 | 8/2018 | Onno et al. |
| 2019/0215268 A1 | 7/2019 | Tandel et al. |
| 2021/0184970 A1* | 6/2021 | Hong ............... H04L 45/64 |
| 2021/0314277 A1 | 10/2021 | Rolando et al. |

FOREIGN PATENT DOCUMENTS

| | | | |
|---|---|---|---|
| CN | 111740900 A * | 10/2020 | ......... H04L 12/4633 |
| CN | 112511432 A * | 3/2021 | ......... H04L 12/4633 |
| WO | 2021017381 A1 | 2/2021 | |

OTHER PUBLICATIONS

Song, "Tunnel setup method and tunnel setup device", Dec. 24, 2014, CN, English machine translation of CN 104243270 A (Year: 2014).*

Zhang, "Message Processing Method and Device", Nov. 30, 2018, CN, English machine translation of CN 108924062 A (Year: 2018).*

Yu, "Overlay Network Virtualization SFC Routing Configuration, Transmission Method and System", Mar. 16, 2021, CN, English machine translation of CN 112511432 A (Year: 2021).*

Sushritha et al. Service Function Chaining Using SDN. Feb. 2018. International Journal of Innovative Science and Research Technology, vol. 3, Issue 2, pp. 985-990.

Zhang et al. L4-L7 Service Function Chaining Solution Architecture. Version 1.0. Jun. 14, 2015. Open Networking Foundation, pp. 1-36.

Extended European Search Report for European Patent Application No. 22207020.3 dated May 15, 2023. 9 pages.

* cited by examiner

METHOD TO BUILD A SERVICE FUNCTION CHAIN IN AN OVERLAY NETWORK

BACKGROUND

In a network, traffic can be sent to one or more service functions for policy enforcement. In current deployment models, a service function is tightly coupled to the underlying network topology and is often implemented as an embedded service within a piece of network equipment, resulting in relatively rigid and static deployments. In modern networks, service functions can be decoupled from the underlying network topology and deployed as an ordered chain of virtualized functions, known as a service function chain, in public or private clouds. This approach requires the service infrastructure and the service functions to insert and inspect additional packet level encapsulations to convey service function chain information or metadata. This can represent a significant challenge as the service functions may not have the capability to handle additional service function chain encapsulations.

BRIEF SUMMARY

Generally disclosed herein is an approach for building a service function chain in a network that can remove the requirement to encapsulate packet level metadata or other packet levels in a service function chain. The approach allows for implementing service function chains while separating chain metadata from the service function so that service functions are not required to support handling service function chaining metadata. The approach can map a tunnel identifier of an encapsulated data packet to an attachment circuit of a service function and can rewrite the destination media access control (MAC) address of the data packet to the MAC address of the service function.

An aspect of the disclosure provides for a method for routing a data packet through a service function chain. The method includes encapsulating, with one or more processors, the packet with a header including a source IP address, a destination IP address of a destination service function forwarder for a service function of the service function chain, and a tunnel identifier uniquely identifying a tunnel in the service function chain. The method further includes rewriting, with the one or more processors, a destination media access control (MAC) address of the packet to a MAC address of an attachment circuit connected to the destination service function forwarder. The method also includes mapping, with the one or more processors, the tunnel identifier to the attachment circuit. The method further includes sending, with the one or more processors, the encapsulated packet to the service function forwarder through the tunnel identified by the tunnel identifier.

In an example, the source IP address is a source IP address of one of a service edge node or a source service function forwarder. In another example, the method further includes setting, with the one or more processors, a source MAC address of the packet. In yet another example, the source MAC address is a source MAC address of one of a service edge node or a source service function forwarder. In yet another example, the method further includes performing, with the one or more processors, a route lookup using the destination IP address of the packet to provide the tunnel identifier and the MAC address of the attachment circuit connected to the destination service function forwarder.

In yet another example, the method further includes decapsulating, with the one or more processors, the encapsulated packet at the destination service function forwarder. In yet another example, the method further includes encapsulating, with the one or more processors, the packet with a header comprising an additional source IP address, a destination IP address of a service edge node, and a tunnel identifier uniquely identifying an additional tunnel in the service function chain. In yet another example, the method further includes rewriting, with the one or more processors, the destination MAC address of the packet to an MAC address of the service edge node. In yet another example, the method further includes mapping, with the one or more processors, the tunnel identifier uniquely identifying the additional tunnel to the service edge node. In yet another example, the method further includes sending, with the one or more processors, the encapsulated packet to the service edge node through the additional tunnel.

Another aspect of the disclosure provides for a system including one or more processors; and one or more storage devices coupled to the one or more processors and storing instructions that, when executed by the one or more processors, causes the one or more processors to perform operations for routing a data packet through a service function chain. The operations include encapsulating the packet with a header comprising a source IP address, a destination IP address of a destination service function forwarder for a service function of the service function chain, and a tunnel identifier uniquely identifying a tunnel in the service function chain. The operations further include rewriting a destination media access control (MAC) address of the packet to a MAC address of an attachment circuit connected to the destination service function forwarder. The operations also include mapping the tunnel identifier to the attachment circuit. The operations further include sending the encapsulated packet to the service function forwarder through the tunnel identified by the tunnel identifier.

In an example, the source IP address is a source IP address of one of a service edge node or a source service function forwarder. In another example, the operations further include setting a source MAC address of the packet, where the source MAC address is a source MAC address of one of a service edge node or a source service function forwarder. In yet another example, the operations further include performing a route lookup using the destination IP address of the packet to provide the tunnel identifier and the MAC address of the attachment circuit connected to the destination service function forwarder.

In yet another example, the operations further include decapsulating the encapsulated packet at the destination service function forwarder. In yet another example, the operations further include encapsulating the packet with a header comprising an additional source IP address, a destination IP address of a service edge node, and a tunnel identifier uniquely identifying an additional tunnel in the service function chain; rewriting the destination MAC address of the packet to an MAC address of the service edge node; mapping the tunnel identifier uniquely identifying the additional tunnel to the service edge node; and sending the encapsulated packet to the service edge node through the additional tunnel.

Yet another aspect of the disclosure provides for a non-transitory computer readable medium for storing instructions that, when executed by one or more processors, causes the one or more processors to perform operations for routing a data packet through a service function chain. The operations include encapsulating the packet with a header comprising a source IP address, a destination IP address of a destination service function forwarder for a service function of the service function chain, and a tunnel identifier uniquely identifying a tunnel in the service function chain. The operations further include rewriting a destination media access control (MAC) address of the packet to a MAC address of an attachment circuit connected to the destination service function forwarder. The operations also include mapping the tunnel identifier to the attachment circuit. The operations further include sending the encapsulated packet to the service function forwarder through the tunnel identified by the tunnel identifier.

In an example, the operations further include setting a source MAC address of the packet, where the source MAC address is a source MAC address of one of a service edge node or a source service function forwarder. In another example, the operations further include performing a route lookup using the destination IP address of the packet to provide the tunnel identifier and the MAC address of the attachment circuit connected to the destination service function forwarder.

In yet another example, the operations further include encapsulating the packet with a header comprising an additional source IP address, a destination IP address of a service edge node, and a tunnel identifier uniquely identifying an additional tunnel in the service function chain; rewriting the destination MAC address of the packet to an MAC address of the service edge node; mapping the tunnel identifier uniquely identifying the additional tunnel to the service edge node; and sending the encapsulated packet to the service edge node through the additional tunnel.

DETAILED DESCRIPTION

Generally disclosed herein is an approach for building a service function chain in a network, where a tunnel identifier of an encapsulated data packet is mapped to an attachment circuit of the service function and a destination media access control (MAC) address of the data packet is rewritten to the MAC address of the service function. The approach can enable a service function chain implementation while abstracting chain metadata to allow each service function to remain oblivious to underlying chain implementations.

Figure 1:
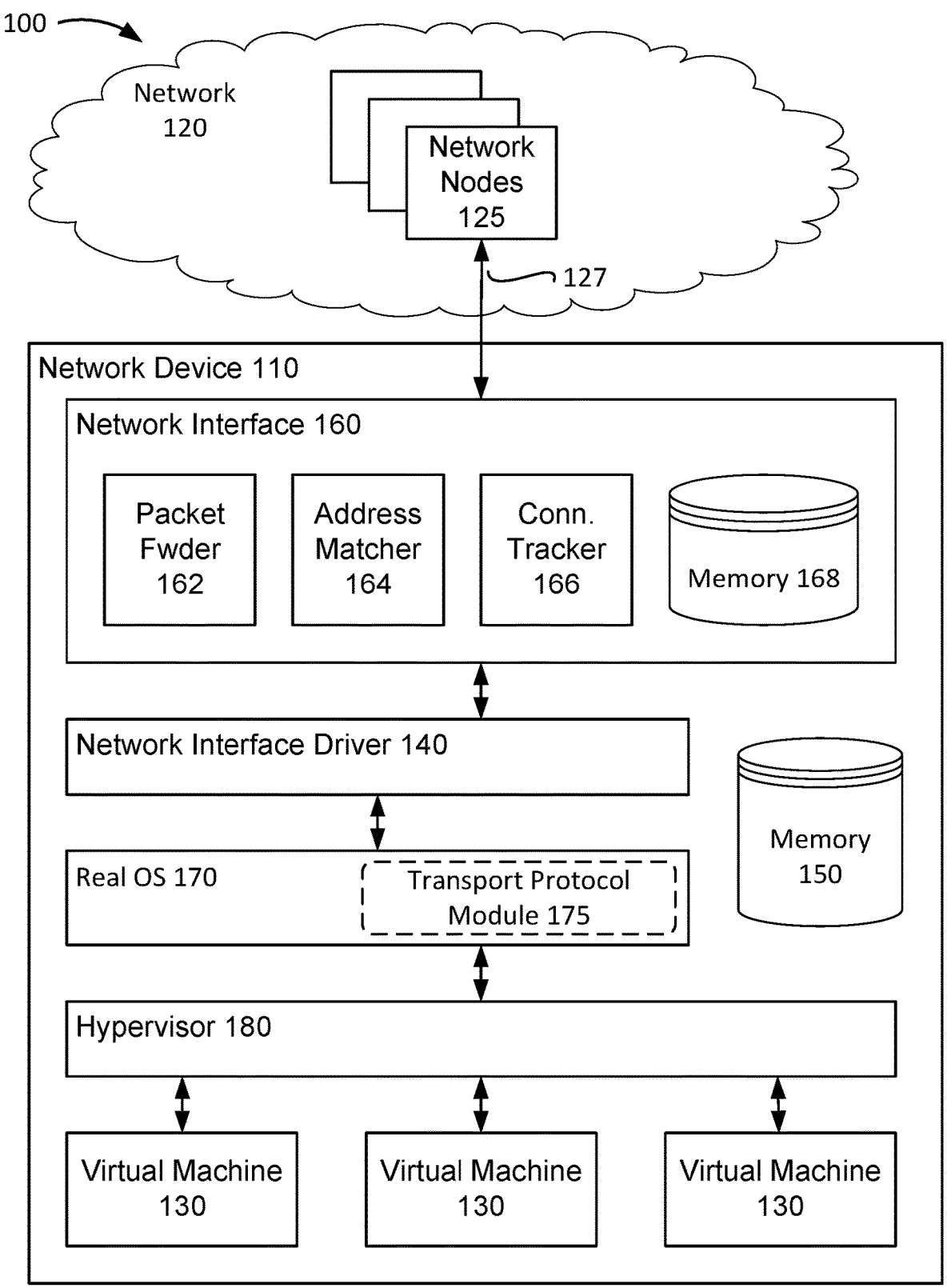
FIG. 1 depicts a block diagram of an example network environment with a network device according to aspects of the disclosure.

FIG. 1 depicts an example network environment 100 with a network device 110. The network environment 100 includes a network 120 of interconnected network nodes 125. The network nodes 125 participate in the network 120 as data sources, data destinations or data sinks, and/or intermediary nodes such as switches, routers, and/or gateways propagating data from sources towards destinations through the network 120. The network nodes 125 can be service functions, service function forwarders, and/or service edge nodes, to be described further below with respect to FIGS. 2-3. The network 120 includes the network device 110 with links 127 to various other participating network nodes 125.

The network 120 can facilitate interactions between participant devices. Example networks include the Internet, a local network, a network fabric, or any other local area or wide area network. The network 120 can be composed of multiple connected sub-networks or autonomous networks. The network 120 can be a local-area network (LAN), such as a company intranet, a metropolitan area network (MAN), a wide area network (WAN), an inter-network such as the Internet, or a peer-to-peer network. Any type and/or form of data network and/or communication network can be used for the network 120. It can be public, private, or a combination of public and private networks. In general, the network 120 can be used to convey information between computing devices; for example, network nodes 125, and the network device 110.

The network device 110 can be a host device or server executing one or more virtual machines 130 on one or more CPUs of the network device 110. The network device 110 can include a network interface driver 140, a memory 150, a network interface 160, a real operating system (OS) 170, a hypervisor 180, and the virtual machines 130. The network device 110 can communicate with other network devices over the network 120. The network device 110 and other network devices can create or participate in one or more virtual networks to facilitate communication between virtual machines 130. The one or more virtual networks can overlay the physical network that makes up the network 120. Routing data packets within one of the virtual networks overlaying the physical network can be accomplished using a system of data packet encapsulation, to be described further below with respect to FIGS. 2-3. The network device 110 and the network nodes 125 can route the data packets according to virtual Internet protocol addresses (VIPs) and MAC addresses. In some examples, the network device 110 can host one or more virtual machines 130 that transmit data packets or receive data packets. In other examples, the network device 110 can be an intermediate node of a path between two virtual machines executing on two separate network devices. Accordingly, the network device 110 can act as a source, destination, or intermediate switch in one or more virtual networks.

The hypervisor 180 can manage operation of the virtual machines 130, including spinning up and terminating the virtual machines 130, managing allocation of memory 150 to the virtual machines 130, and live migrating the virtual machines 130 to other network devices.

The memory 150 can store data and/or computer executable instructions related to the operation and use of the network interface driver 140. The memory 150 can include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory, as examples.

The memory 150 can store computer executable instructions of a transport protocol module 175, such as a transmission control protocol (TCP) module or the TCP layer of a network stack, to be executed on a processor of the network device 110. Functionality occurring within a TCP layer of a network stack can be additionally or alternatively executed in another network protocol module within the transport layer, the network layer, or a combined transport/network layer of a network stack. For example, the functionality can be implemented in a user datagram protocol (UDP) module, reliable datagram protocol (RDP) module, reliable user datagram protocol (RUDP) module, or a datagram congestion control protocol (DCCP) module. A network layer, a transport layer, or a combined transport/network layer can generally be referred to as a packet layer of a network stack.

The network interface driver 140 can include a network interface driver software module running on the real OS 170. As an example, the network interface driver can be a collection of computer executable instructions stored in the memory 150 that when executed by a processor help facilitate network communications. As another example, the network interface driver 140 can be implemented as logic in a hardware processor or other integrated circuit, or as a combination of hardware and software logic. The network interface driver 140 can communicate with one of the software virtual machines 130 directly or via a guest OS of the virtual machine 130 and/or the hypervisor 180.

The network interface driver 140 can be included within a layer of a network stack of the real OS 170 of the network device 110. In an example, the network interface driver 140 can be included within a data link layer of a network stack and can communicate with a software module or application that is included in an application layer of the network stack. In another example, the network interface driver 140 can be included within a link layer of a network stack and can communicate with a TCP/IP module that is included in an internet/transport layer of the network stack. In other examples, the functionality occurring within the layer of the network stack can additionally or alternatively be configured to receive packets from another network or transport layer protocol module, such as a user datagram protocol (UDP) module, reliable datagram protocol (RDP) module, reliable user datagram protocol (RUDP) module, or a datagram congestion control protocol (DCCP) module. While not shown, the network interface driver 140 can be included as a portion of the network interface 160.

The network interface 160 can include a packet forwarder 162, an address matcher 164, a connection tracker 166, and a memory 168. The memory 168 can store data and/or computer executable instructions related to the operation and use of the network interface card 160. The memory 168 can store route lookup tables that include destination addresses corresponding to VIP and MAC addresses. The memory 168 can include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory, as examples.

The packet forwarder 162 can be implemented in an application-specific integrated circuit (ASIC) or as software executing on a microprocessor. The packet forwarder 162 can receive packets for transmission from the virtual machines 130 and route them to one or more destination virtual machines executing on remote network devices. The packet forwarder 162 can encapsulate a data packet with a header that includes a source IP address, a destination IP address, and a tunnel identifier, rewrite a destination MAC address of the data packet, map the tunnel identifier, and transmit the encapsulated data packet. The packet forwarder 162 can also perform functions that allow the network interface 160 to act as a destination for data packets received over the links 127. For example, the packet forwarder 162 can receive a data packet over one of the lines 127, decapsulate the data packet, and forward the data packet to one or more destination virtual machines 130 executing on the network device 110.

The address matcher 164 can be implemented in an application-specific integrated circuit (ASIC) or as software executing on a microprocessor. As an example, the address matcher 164 can receive a data packet from a local virtual machine, i.e., a virtual machine 130 executing on the local network device 110, where the destination for the data packet is a virtual machine executing on a remote network device. The address matcher 164 can determine the destination virtual machine of the data packet based on the longest prefix match of a destination address of the data packet, where the destination address corresponds to the destination virtual machine. The address matcher 164 can select a path to the destination network device from a plurality of equal-cost multipath (ECMP) paths. The address matcher 164 can then encapsulate the data packet with an outer header having a second destination address that corresponds to the destination network device. The address matcher 164 can then transmit the encapsulated packet.

The connection tracker 166 can be implemented in an application-specific integrated circuit (ASIC) or as software executing on a microprocessor. As an example, the connection tracker 166 can perform firewall type functions whereby it monitors packets for transmission from the virtual machines 130 executing on the network device 110 destined for target virtual machines, hosts, or clients external to the network device 110. The connection tracker 166 can determine whether either or both of a source port number or a destination port number fall within a range of port numbers permitted by the policies imposed on the network device 110 and/or the virtual machines 130. In addition, the connection tracker 166 can record metadata regarding the data packet in a connection flow table or other log maintained in the network interface memory 168. In this manner, the connection tracker 166 can check port numbers and record log entries in hardware on the network interface 140; that is, between the processor of the network interface 160 and the memory 168. If the connection tracker 166 determines that one of the port numbers is not within a permitted range, it can drop or block the data packet and can also send a notification to the virtual machine 130 and/or the hypervisor 180 notifying it of a possible breach of a network policy. If the port number is determined to be within range, the connection tracker 166 can insert an entry corresponding to the data packet in the connection flow table in the memory 168 and transmit the data packet.

Figure 2:
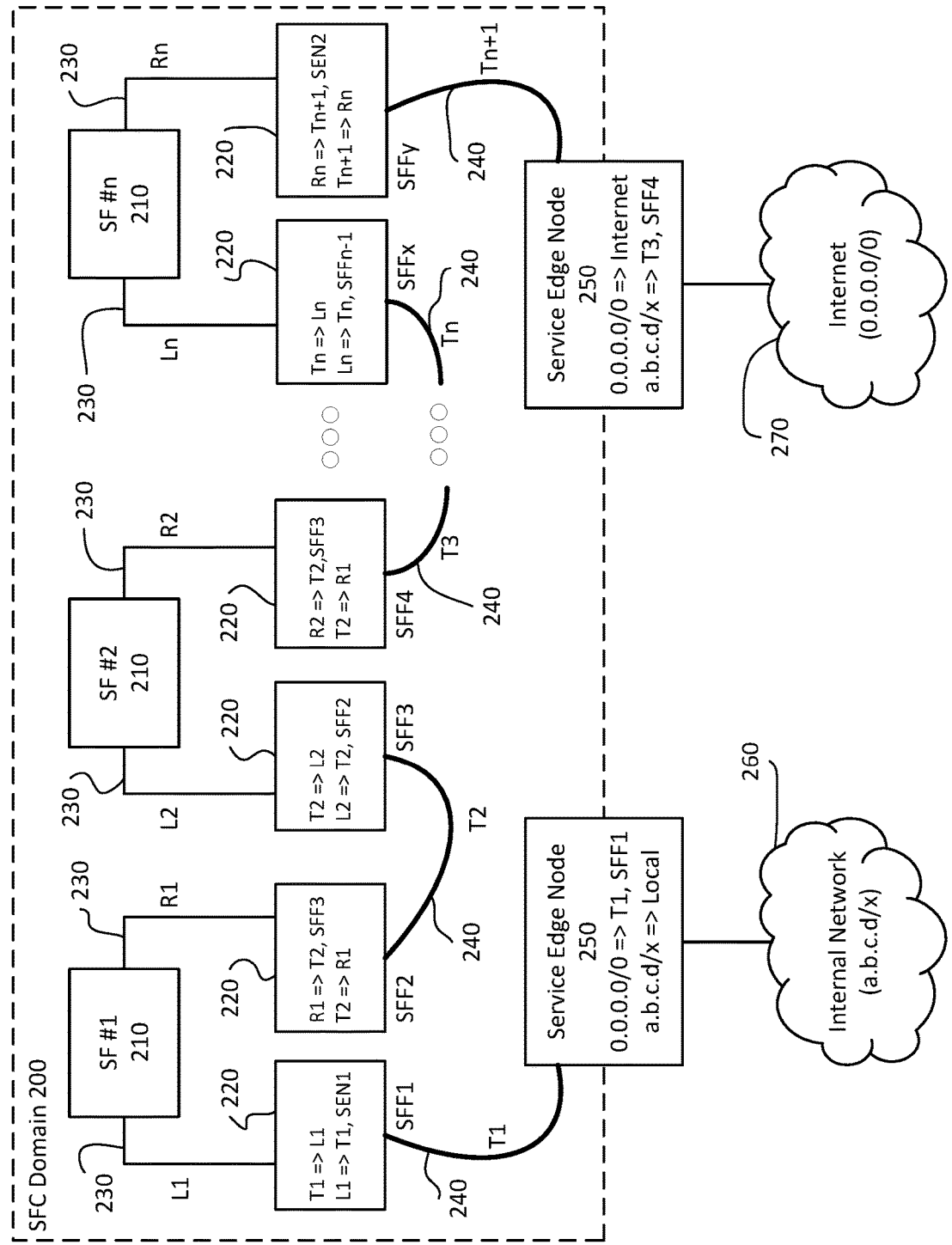
FIG. 2 depicts a block diagram of an example service function chain domain for implementing the tunnel identifier mapping and destination MAC address rewriting according to aspects of the disclosure.

FIG. 2 depicts an example service function chain (SFC) domain 200 for implementing the tunnel identifier mapping and destination MAC address rewriting. The SFC domain 200 can be a network, such as an overlay network. An overlay network can be a virtualized network supported by an underlying physical network. Example overlay networks can include distributed systems such as peer-to-peer networks and client-server applications. The network can be the network 120, as described with respect to FIG. 1.

The SFC domain 200 can include a plurality of service functions (SFs) 210 that can form a service function chain (SFC). The SFC can include any number of SFs 210. A SFC defines an ordered set of SFs and steers traffic of data packets therethrough. One or more SFs can be applied to the data packet or frame in a specific order.

A SF 210 can be responsible for a specific treatment of a received data packet. The SF 210 can be a virtual element or be embedded in a physical network element. Example SFs 210 can include wide area network and application accelerating, encapsulation/decapsulation, stateful or stateless packet filtering, intrusion detection, network address translation (NAT), lawful intercept, and transmission control protocol (TCP) optimization.

Each SF 210 can be connected to two service function forwarders (SFFs) 220 via respective attachment circuits 230. A SFF 220 can be responsible for forwarding packets to one or more connected SFs 210 based on information carried in the packet or explicit SFC encapsulation. A SFF 220 can also be responsible for handling packets returning from the SF 210 and delivering packets to other SFFs 220.

The attachment circuit 230 can be an interface construct that attaches a SF 210 to an SFF 220. There can be at least one attachment circuit 230 for a SF 210. For example, a terminating SF can have one attachment circuit while a transit SF can have two attachment circuits, which can be referred to as left and right or first and second. Forward traffic can enter the SF on its left or first interface and leave on the right or second interface with the SF applied. Return traffic can enter the SF on its right or second interface and leave on the left or first interface with the SF applied.

The SFFs 220 of different SFs 210 can be connected to each other via tunnels 240. Encapsulated data packets are transmitted through the tunnels 240 to their destinations.

The SFC can further include at least one service edge node 250 for entering and/or exiting the SFC domain 200. The service edge node 250 can be the same node for entering and exiting if the node supports multiple lookup tables, e.g., a lookup table for entry and a lookup table for exit. Otherwise, the SFC can include a service edge node 250 for entering the domain and a service edge node 250 for exiting the domain. The service edge nodes 250 can each be connected to a SFF 220 via a tunnel 240. A SFF 220 can further be responsible for handling data packets received from a service edge node 250 or delivering data packets to a service edge node 250.

The service edge nodes 250 can be connected to a network. For example, the service edge node 250 for entering the domain can be connected to an internal or local network 260 while the service edge node for exiting the domain can be connected to the Internet 270.

A data packet from the network 260 can be sent to the SFC domain 200 through a service edge node 250. The data packet can be forward traffic or return traffic. The domain 200 can be bi-directional or unidirectional.

The service edge node 250 can encapsulate the packet, including setting a tunnel identifier for determining through which tunnel 240 to send the encapsulated packet, and send the encapsulated packet to a SFF 220 of a SF 210 through the identified tunnel 240. A tunnel identifier can uniquely identify each tunnel 240 in the SFC. Example tunnel identifiers include virtual network identifiers (VNIs) such as a VXLAN VNI, or a GENEVE VNI. On the service edge node 250, a route lookup can be performed using a destination IP address of the packet. The result of the lookup can provide a tunnel identifier and a MAC address of an attachment circuit 230 attaching the SFF 220 to the SF 210.

A source MAC address of the packet can be set to the MAC address of the service edge node 250 and a destination MAC address of the packet can be rewritten to the MAC address of the attachment circuit 230. In another example, the destination MAC address of the service edge node 250 can be rewritten to the MAC address of the SFF 220. In this example, the SFF 220 can then further rewrite the destination MAC address of the service edge node 250 to the MAC address of the SF 210. In yet another example, the destination MAC address of the service edge node 250 can be rewritten to the MAC address of the SF 210. In this example, the SFF 220 can forward the packet to the SF 210 without rewriting its own MAC address.

Setting the source MAC address and rewriting the destination MAC address can be performed at the ingress or egress of the tunnel 240. The packet can be encapsulated using tunnel encapsulation with tunnel source being the IP address of the service edge node 250, destination being the address of the SFF 220, and the tunnel identifier set. The encapsulated packet can then be sent to the SFF 220.

The SFFs 220 can map the tunnel identifier to the attachment circuit 230. The mapping can be implemented as a direct mapping or using a route lookup. On receiving the packet over the tunnel 240, the SFF 220 can perform a lookup using the tunnel identifier as a key and a resultant attachment circuit 230 is used to send the packet to the SF 210 after decapsulation. A SFF 220 can receive the packet from a tunnel 240, decapsulate the packet, and forward the packet to an attachment circuit 230 to be inspected by a SF 210. Another SFF 220 can receive the packet from an attachment circuit 230 after being inspected by an SF 210 and tunnel the packet to a different SFF 220 if the packet should be inspected by another SF 210 or to another service edge node 250 if the packet should exit the domain 200.

The SFFs 220 can also respond to address resolution protocol (ARP)/neighbor discovery (ND) requests from a connected SF 210 so that the SF 210 can remain unaware of SFC encapsulations. For example, the SFF 220 can respond to an ARP/ND request from the SF 210 to receive the packet from it, where the SF 210 can send the packet to the SFF 220 without any knowledge about the next SF 210 to process the packet or the SFC more generally.

Once the packet is inspected by each SF 210 in the SFC, a SFF 220 sends the packet through a tunnel 240 to a service edge node 250, which forwards the packet to the network 270. Whenever the packet is sent through a tunnel 240, the destination MAC of the packet is rewritten based on the next hop.

Figure 3:
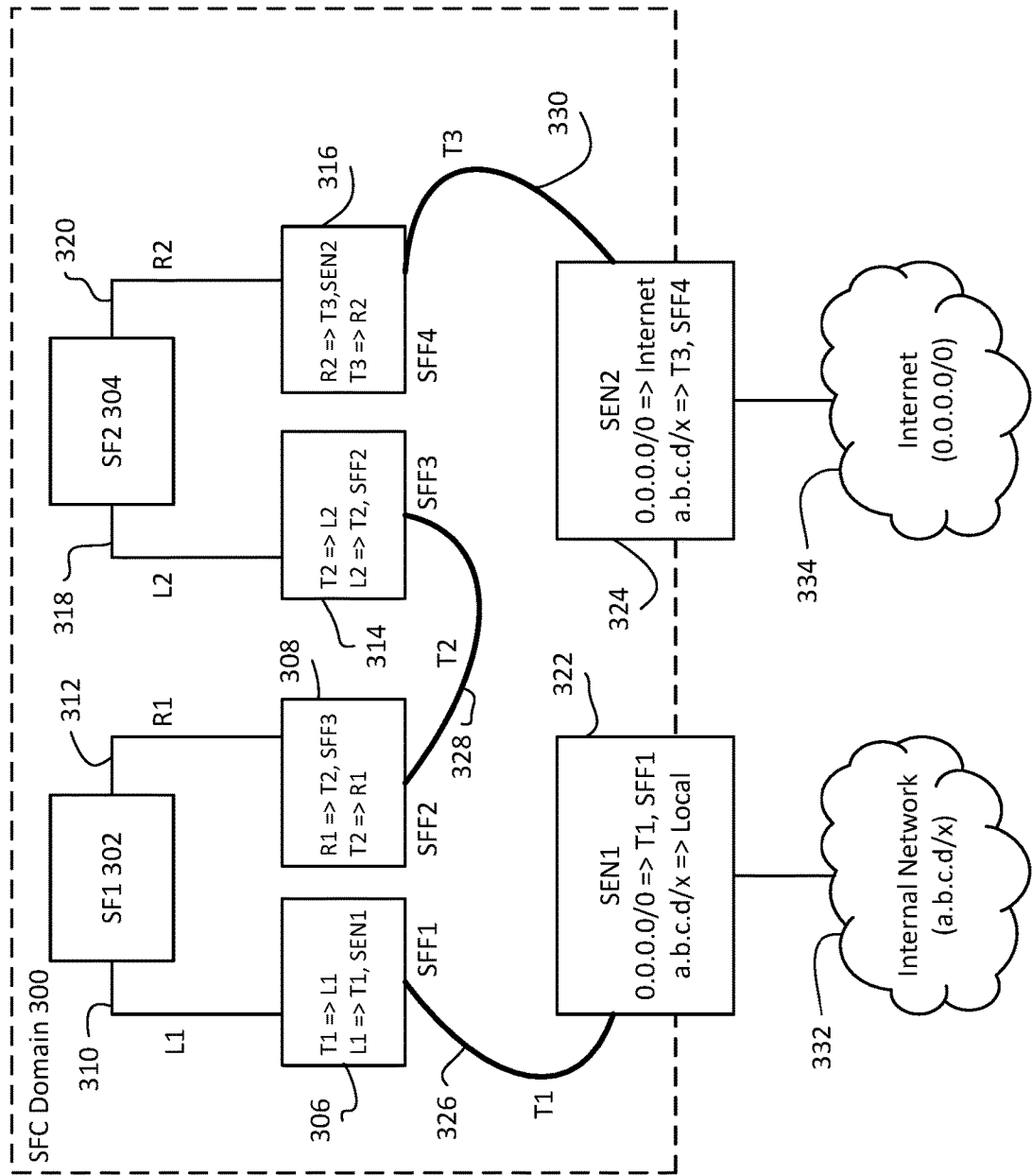
FIG. 3 depicts a block diagram of an example service function chain domain with two service functions for implementing the tunnel identifier mapping and destination MAC address rewriting according to aspects of the disclosure.

FIG. 3 depicts an example SFC domain 300 with two SFs for implementing the tunnel identifier mapping and destination MAC address rewriting. Here, the SFC domain 300 includes a SFC formed by a first SF 302 and a second SF 304. The first SF 302 is connected to a first SFF 306 and a second SFF 308 via a first left attachment circuit 310 and a first right attachment circuit 312, respectively. The second SF 304 is connected to a third SFF 314 and a fourth SFF 316 via a second left attachment circuit 318 and a second right attachment circuit 320, respectively. The SFC further includes a first service edge node 322 and a second service edge node 324. The first service edge node 322 is connected to the first SFF 306 via a first tunnel 326, the second SFF 308 is connected to the third SFF 314 via a second tunnel 328, and the fourth SFF 316 is connected to the second service edge node 324 via a third tunnel 330. The first service edge node 322 can be connected to a first network 332, such as an internal network, and the second service edge node 324 can be connected to a second network 334, such as the Internet.

Figure 4:
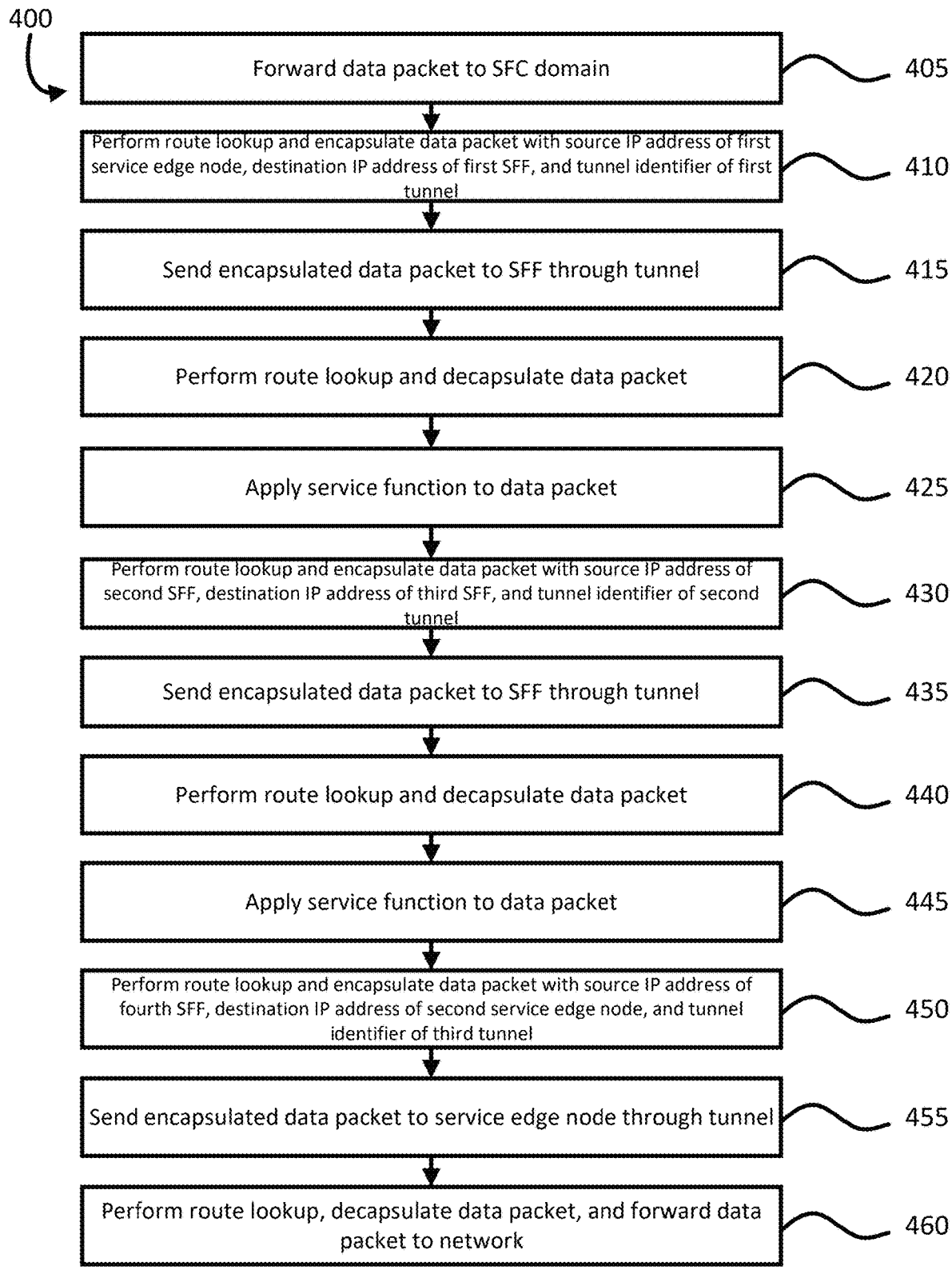
FIG. 4 depicts a flow diagram of an example process for routing data packets through a SFC in a SFC domain according to aspects of the disclosure.

FIG. 4 depicts a flow diagram of an example process 400 for routing data packets through a SFC in a SFC domain. The example process 400 can be performed on a system of one or more processors in one or more locations, such as the example network device 110 of FIG. 1. The example process 400 will be described with respect to the example SFC domain 300 of FIG. 3, but it should be noted the example process 400 can be applied to the more general SFC domain 200 of FIG. 2. While the process 400 will describe forward traffic through the SFC domain 300, it should also be noted the same process can be utilized for return traffic, just in reverse.

As shown in block 405, the first service edge node 322 can receive a data packet from the first network 332 and can forward the data packet to the SFC domain 300. This can be the result of traffic classification; for example, only a subset of traffic can be sent to the first service edge node 322.

As shown in block 410, the first service edge node 322 can perform a route lookup using the destination IP address of the data packet. The result of this lookup can provide a tunnel identifier for the first tunnel 326 and the address of the first SFF 306 that is attached to the first left attachment circuit 310 of the first SF 302. The first service edge node 322 can set the source MAC address of the data packet to the MAC address of the first service edge node 322 and can rewrite the destination MAC address of the data packet to the MAC address of the first left attachment circuit 310. The first service edge node 322 can encapsulate the data packet using tunnel encapsulation with the tunnel source being the IP address of the first service edge node 322, the tunnel destination being the IP address of the first SFF 306, and the identifier being the tunnel identifier of the first tunnel 326.

As shown in block 415, the first service edge node 322 can send the encapsulated data packet to the first SFF 306.

As shown in block 420, the first SFF 306 can perform a route lookup using the tunnel identifier of the first tunnel 326 as the key and the resultant attachment circuit can be used to send the data packet to the first SF 302. The first SFF 306 can decapsulate the data packet and send the data packet to the first SF 302 via the first left attachment circuit 310.

As shown in block 425, the first SF 302 can receive the data packet on the first left attachment circuit 310, apply the service function, and send the data packet out on the first right attachment circuit 312.

As shown in block 430, the second SFF 308 can receive the data packet from the first right attachment circuit 312. The second SFF 308 can perform a route lookup using the first right attachment circuit identifier as the key. The result of this route lookup can provide a tunnel identifier and the IP address of the third SFF 314 that is attached to the left attachment circuit 318 of the second SF 304. The second SFF 308 can set the source MAC address of the data packet to the MAC address of the second SFF 308 and can rewrite the destination MAC address of the data packet to the MAC address of the second left attachment circuit 318. The second SFF 308 can encapsulate the data packet using the tunnel encapsulation with tunnel source being the IP address of the second SFF 308, destination being the IP address of the third SFF 314, and the identifier being set to the tunnel identifier of the second tunnel 328.

As shown in block 435, the second SFF 308 can send the encapsulated data packet to the third SFF 314.

As shown in block 440, on receiving the data packet over the second tunnel 328, the third SFF 314 can perform a route lookup using the tunnel identifier of the second tunnel 328 as the key and the resultant attachment circuit can be used to send the data packet to the second SF 304. The SFF 314 can decapsulate the data packet and send the data packet to the second SF 304 via the second left attachment circuit 318.

As shown in block 445, the second SF 304 can receive the data packet on the second left attachment circuit 318, apply the service function, and send the data packet out on the second right attachment circuit 320.

As shown in block 450, the fourth SFF 316 can receive the data packet from the second right attachment circuit 320. The fourth SFF 316 can perform a route lookup using the second right attachment circuit 320 as the key. The result of this route lookup can provide a tunnel identifier and IP address of the second service edge node 330 that is attached to the second network 334. The fourth SFF 316 can set the source MAC address of the data packet to the MAC address of the fourth SFF 316 and can rewrite the destination MAC address of the data packet to the MAC address of the second service edge node 324. The fourth SFF 316 can encapsulate the data packet using tunnel encapsulation with the tunnel source being the IP address of the fourth SFF 316, the tunnel destination being the IP address of the second service edge node 324, and the identifier being the tunnel identifier of the third tunnel 330.

As shown in block 455, the fourth SFF 316 can send the encapsulated data packet to the second service edge node 324.

As shown in block 460, the second service edge node 324 can decapsulate the data packet, perform a route lookup using the destination IP address of the data packet, and forward the data packet to the second network 334.

Figure 5:
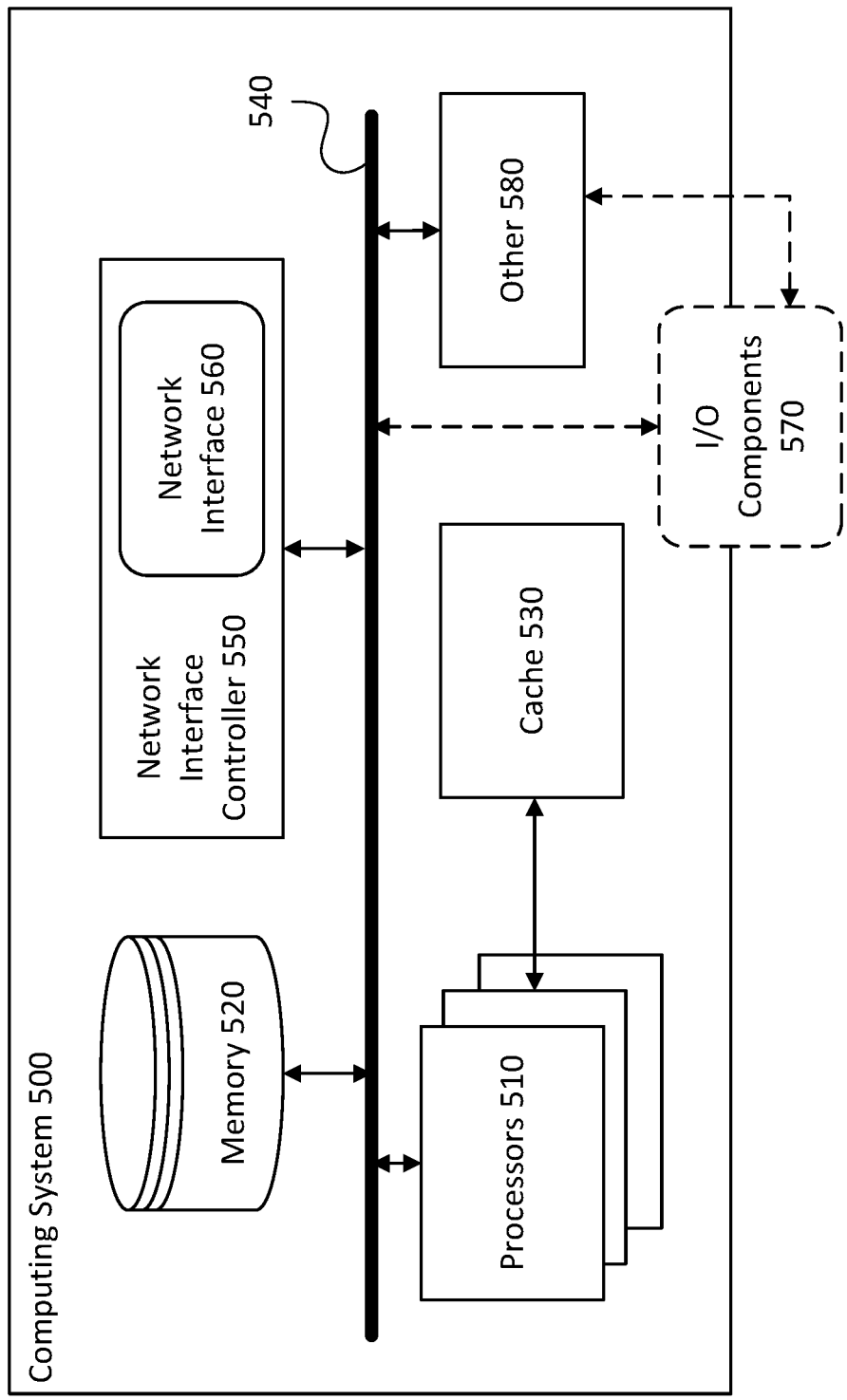
FIG. 5 depicts a block diagram of an example computing system according to aspects of the disclosure.

FIG. 5 depicts an example computing system 500, which can be configured as the network device 110 of FIG. 1. The computing system 500 can include one or more processors 510 in communication with memory 520, at least one network interface controller 550 with network interface port 560 for connection to a network, input/output (I/O) components 570, and other components 580. The processors 510 can be in communication with the memory 520, network interface controller 550, I/O components 570, and other components 580 via a bus 540, as an example. The processors 510 can incorporate, or are connected to, cache memory 530. In some instances, instructions are read from memory 520 into cache memory 530 and executed by the processors 510 from cache memory 530.

The processors 510 can be any logic circuitry that executes instructions fetched from the memory 520 or cache 530. The processors 510 can be microprocessor units or special purpose processors. The computing device 500 can be based on any processor, or set of processors, capable of operating as described herein. The processors 510 can be single core or multi-core processors. The processors 510 can be multiple distinct processors. The processors 510 can be implemented as circuitry on one or more chips.

The memory 520 can be any device suitable for storing computer readable data. The memory 520 can be a device with fixed storage or a device for reading removable storage media. Examples include all forms of non-volatile memory, media and memory devices, semiconductor memory devices, e.g., EPROM, EEPROM, SDRAM, and flash memory devices, magnetic disks, magneto-optical disks, and optical discs, e.g., CD ROM, DVD-ROM, or Blu-Ray® discs. The computing system 500 can have any number of memory devices 520.

The cache memory 530 can be a form of computer memory placed in close proximity to the processors 510 for fast access times. The cache memory 530 can be part of, or on the same chip as, the processors 510. There can be multiple levels of cache 530, e.g., level 2 and level 3 cache layers.

The network interface controller 550 can manage data exchanges via the network interface 560. The network interface controller 550 can handle the physical and data link layers of the open systems interconnection (OSI) model for network communication. Some of the tasks of the network interface controller 550 can be handled by one or more of the processors 510. The network interface controller 550 can be incorporated into the processors 510, e.g., as circuitry on the same chip.

The computing system 500 can have multiple network interfaces 560 controlled by a single controller 550 or multiple network interface controllers 550. Each network interface 560 can be a connection point for a physical network link, e.g., a cat-5 Ethernet link. The network interface controller 550 can support wireless network connections and an interface port 560 can be a wireless, e.g., radio, receiver/transmitter. The network interface controller 550 can implement one or more network protocols such as Ethernet. The computing system 500 can exchange data with other computing systems via physical or wireless links through a network interface 560. The network interface 560 can link directly to another device or to another device via an intermediary device, e.g., a network device such as a hub, a bridge, a switch, or a router, connecting the computing device 500 to a data network such as the Internet.

The computing system 500 can include, or provide interfaces for, one or more input or output (I/O) components 570. Input devices can include keyboards, microphones, touch screens, sensors, and pointing devices, such as a mouse or trackball, as examples. Output devices can include video displays, speakers, and printers, as examples.

Other components 580 can include an I/O interface, external serial device ports, and any additional co-processors. For example, the computing system 500 may include an interface, e.g., a universal serial bus (USB) interface, for connecting input devices, output devices, or additional memory devices, e.g., portable flash drive or external media drive. The computing device 500 can include an additional co-processor, such as a math co-processor to assist the processors 510 with high precision or complex calculations.

As such, generally disclosed herein is an approach for building a service function chain in a network that can remove the requirement to encapsulate packet level metadata or other packet levels in a service function chain. The approach allows for implementing service function chains while separating chain metadata from the service function so that service functions are not required to support handling service function chaining metadata. The approach can map a tunnel identifier of an encapsulated data packet to an attachment circuit of a service function and can rewrite the destination media access control (MAC) address of the data packet to the MAC address of the service function.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for routing a data packet through a service function chain, the method comprising:
   performing, with one or more processors, a route lookup using a destination internet protocol (IP) address of the data packet to determine an IP address of a service function forwarder for a service function of the service function chain, a tunnel identifier uniquely identifying a tunnel in the service function chain, and a media access control (MAC) address of an attachment circuit connected to the service function forwarder;
   encapsulating, with the one or more processors, the data packet with a header comprising the IP address of the service function forwarder and the tunnel identifier;
   rewriting, with the one or more processors, a destination MAC address of the data packet to be the MAC address of the attachment circuit;
   mapping, with the one or more processors, the tunnel identifier to the attachment circuit; and
   sending, with the one or more processors, the encapsulated data packet to the service function forwarder through the tunnel identified by the tunnel identifier.

2. The method of claim 1, wherein the header further comprises a source IP address that is of one of a service edge node or a source service function forwarder for a service function of the service function chain.

3. The method of claim 1, further comprising setting, with the one or more processors, a source MAC address of the data packet.

4. The method of claim 3, wherein the source MAC address is a source MAC address of one of a service edge node or a source service function forwarder.

5. The method of claim 1, further comprising decapsulating, with the one or more processors, the encapsulated data packet at the service function forwarder.

6. The method of claim 1, further comprising encapsulating, with the one or more processors, the data packet with a header comprising a destination IP address of a service edge node and a tunnel identifier uniquely identifying an additional tunnel in the service function chain.

7. The method of claim 6, further comprising rewriting, with the one or more processors, the destination MAC address of the data packet to be an MAC address of the service edge node.

8. The method of claim 6, further comprising mapping, with the one or more processors, the tunnel identifier uniquely identifying the additional tunnel to the service edge node.

9. The method of claim 6, further comprising sending, with the one or more processors, the encapsulated data packet to the service edge node through the additional tunnel.

10. A system comprising:
    one or more processors; and
    one or more storage devices coupled to the one or more processors and storing instructions that, when executed by the one or more processors, causes the one or more processors to perform operations for routing a data packet through a service function chain, the operations comprising:
       performing a route lookup using a destination internet protocol (IP) address of the data packet to determine an IP address of a service function forwarder for a service function of the service function chain, a tunnel identifier uniquely identifying a tunnel in the service function chain, and a media access control (MAC) address of an attachment circuit connected to the service function forwarder;

encapsulating the data packet with a header comprising the IP address of the service function forwarder and the tunnel identifier;

rewriting a destination MAC address of the data packet to be the MAC address of the attachment circuit;

mapping the tunnel identifier to the attachment circuit; and sending the encapsulated data packet to the service function forwarder through the tunnel identified by the tunnel identifier.

11. The system of claim 10, wherein the header further comprises a source IP address that is of one of a service edge node or a source service function forwarder for a service function of the service function chain.

12. The system of claim 10, wherein the operations further comprise setting a source MAC address of the data packet, wherein the source MAC address is a source MAC address of one of a service edge node or a source service function forwarder.

13. The system of claim 10, wherein the operations further comprise decapsulating the encapsulated data packet at the service function forwarder.

14. The system of claim 10, wherein the operations further comprise:

encapsulating the data packet with a header comprising a destination IP address of a service edge node and a tunnel identifier uniquely identifying an additional tunnel in the service function chain;

rewriting the destination MAC address of the data packet to be an MAC address of the service edge node;

mapping the tunnel identifier uniquely identifying the additional tunnel to the service edge node; and sending the encapsulated data packet to the service edge node through the additional tunnel.

15. A non-transitory computer readable medium for storing instructions that, when executed by one or more processors, causes the one or more processors to perform operations for routing a data packet through a service function chain, the operations comprising:

performing a route lookup using a destination internet protocol (IP) address of the data packet to determine an IP address of a service function forwarder for a service function of the service function chain, a tunnel identifier uniquely identifying a tunnel in the service function chain, and a media access control (MAC) address of an attachment circuit connected to the service function forwarder;

encapcilating the data packet with a header comprising the IP address of the service function forwarder and the tunnel identifier;

rewriting a MAC address of the data packet to be the MAC address of the attachment circuit;

mapping the tunnel identifier to the attachment circuit; and sending the encapsulated data packet to the service function forwarder through the tunnel identified by the tunnel identifier.

16. The non-transitory computer readable medium of claim 15, wherein the operations further comprise setting a source MAC address of the data packet, wherein the source MAC address is a source MAC address of one of a service edge node or a source service function forwarder.

17. The non-transitory computer readable medium of claim 15, wherein the operations further comprise:

encapsulating the data packet with a header comprising a destination IP address of a service edge node and a tunnel identifier uniquely identifying an additional tunnel in the service function chain;

rewriting the MAC address of the data packet to be an MAC address of the service edge node;

mapping the tunnel identifier uniquely identifying the additional tunnel to the service edge node; and sending the encapsulated data packet to the service edge node through the additional tunnel.

* * * * *